United States Patent
Shakhnovich

(10) Patent No.: US 8,048,213 B2
(45) Date of Patent: Nov. 1, 2011

(54) INKJET INK COMPOSITIONS COMPRISING AZO PIGMENTS

(75) Inventor: Alexander I. Shakhnovich, Westford, MA (US)

(73) Assignee: Cabot Corporation, Boston, MA (US)

( * ) Notice: Subject to any disclaimer, the term of this patent is extended or adjusted under 35 U.S.C. 154(b) by 278 days.

(21) Appl. No.: 12/384,507

(22) Filed: Apr. 6, 2009

(65) Prior Publication Data
US 2010/0251930 A1    Oct. 7, 2010

(51) Int. Cl.
*C09D 11/02* (2006.01)
(52) U.S. Cl. .................................................. 106/31.8
(58) Field of Classification Search .............. 106/31.8
See application file for complete search history.

(56) References Cited

U.S. PATENT DOCUMENTS

| | | | |
|---|---|---|---|
| 4,474,609 A | 10/1984 | Ehl et al. | |
| 4,561,922 A | 12/1985 | Peerman et al. | |
| 6,136,087 A | 10/2000 | Kapoor | |
| 6,503,317 B1 | 1/2003 | Ortalano et al. | |
| 7,223,302 B2 | 5/2007 | Shakhnovich | |
| 7,300,504 B2 | 11/2007 | Shakhnovich | |
| 7,377,974 B2 | 5/2008 | Grimm et al. | |
| 7,416,596 B2 | 8/2008 | Schweikart et al. | |
| 7,419,541 B2 * | 9/2008 | Grimm et al. | 106/31.8 |
| 7,582,150 B2 | 9/2009 | Jaunky et al. | |
| 7,704,312 B2 | 4/2010 | Deroover et al. | |
| 7,727,679 B2 | 6/2010 | Kawaguchi et al. | |
| 2007/0125260 A1 * | 6/2007 | Grimm et al. | 106/31.8 |
| 2008/0227894 A1 | 9/2008 | Loccufier et al. | |
| 2008/0308004 A1 * | 12/2008 | Deroover et al. | 106/31.75 |
| 2008/0312358 A1 * | 12/2008 | Deroover et al. | 523/333 |

FOREIGN PATENT DOCUMENTS

| | | | |
|---|---|---|---|
| GB | 2356634 | * | 5/2001 |
| GB | 2364322 | | 2/2004 |
| WO | WO 00/31189 | | 6/2000 |
| WO | WO 2007/060264 | * | 5/2007 |

OTHER PUBLICATIONS

JP 2004-182952 to Dainichiseika Color & Chem. Mfg. Co. Ltd. (Jul. 2, 2004)—Abstract Only.
JP 2007-186641 to Seiko Epson Corp. (Jul. 26, 2007)—Abstract Only.

* cited by examiner

*Primary Examiner* — Helene Klemanski

(57) ABSTRACT

Inkjet ink compositions comprising a liquid vehicle, an azo pigment, and a synergist are described. The colorant of the azo pigment and the synergist have specific structural features that, in combination, can be used to form an inkjet ink composition having long term stability in a variety of ink vehicles.

14 Claims, No Drawings

INKJET INK COMPOSITIONS COMPRISING AZO PIGMENTS

BACKGROUND OF THE INVENTION

1. Field of the Invention

The present invention relates to inkjet ink compositions comprising at least one azo pigment and at least one synergist.

2. Description of the Related Art

In general, pigments alone are not readily dispersible in liquid vehicles. A variety of techniques have been developed which can provide stable pigment dispersions. For example, dispersants can be added to the pigment to improve its dispersibility in a particular medium. Examples of dispersants for an aqueous medium include water-soluble polymers and surfactants.

Azo pigments are a specific class of colored pigments, generally falling in the yellow, orange, or red color space. These pigments are typically prepared by mixing a diazonium salt (the diazo component) with a compound capable of reacting with a diazonium salt (the azo coupling component). The type and substituents on each component determine the pigments color and brightness.

Dispersions of azo pigments have been prepared using a variety of different techniques, both physical (such as milling) as well as chemical. For example, azo pigment dispersions have been prepared using dispersants having a structural unit similar if not identical to the chemical unit of the colored pigment. For example, GB2356866 discloses a bis-azo compound derived from diazotized (carboxy/sulfo)-anilines and 1,4-bis(acetoacetamido)phenylenes and their use in pigment and ink compositions. These materials were found to be particularly useful in combination with yellow or orange pigments having nearly the identical structure. GB2356634 describes very similar mono-azo compounds for the same use. GB2364322 describes N-(sulfophenyl)-alpha-(2-methoxy-4-nitrophenylazo)acetacetamides for use with monoazo pigments, particularly yellow pigments. Also, in U.S. Pat. No. 6,451,103, water soluble pigment derivatives, which are pigments further substituted with an acidic functional group or salt, are used to prepare aqueous dispersions of that specific pigment. Inkjet inks are also disclosed.

Other methods of controlling the dispersibility of colored pigments are also known. For example, International Patent Application No. WO00/26304 discloses the preparation of a crystal growth inhibitor that controls the amount of crystallinity developed during the process of preparing a colored pigment and prevents recrystallization of dispersed pigments. The crystal growth inhibitor is prepared using a process similar to the known process for preparing the pigment (for example, by the reaction of a diazonium salt with an azo coupling agent), and can also be prepared in situ during the preparation of the colored pigment.

EP 1 316 588 and U.S. Pat. No. 7,300,504 describe methods of preparing dispersions of azo pigments using mixtures of azo couplers or mixtures of diazonium reagents have also been described, including. For example, EP 1 316 588 describes the preparation of a pigment yellow 74 which is obtainable by coupling a diazo component and a coupler component. The coupler component comprises 2-methoxy-acetoacetoanilide and an acetoacetoanilide derivative having a defined formula which can be substituted with a COOH or $SO_3H$ group. A similar approach using mixtures of diazo components having these substituents is also described. Printing inks are also disclosed.

While these methods produce dispersions of azo pigments, some of these dispersions have been found to be particularly sensitive to various cosolvents and additives used in inkjet ink compositions. Therefore, there remains a need in the industry for methods of preparing inkjet ink compositions comprising azo pigments, particularly those have long term dispersion stability across various types of ink vehicles.

SUMMARY OF THE INVENTION

The present invention relates to an inkjet ink composition comprising a) a liquid vehicle, b) at least one azo pigment, and c) at least one synergist. The azo pigment comprises a colorant having the formula

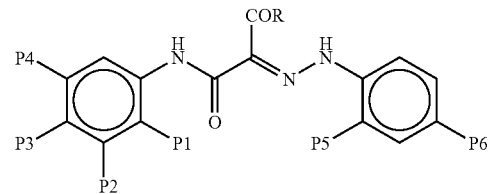

wherein P1-P6 are substituent groups of the colorant of the azo pigment, and wherein P1 and P5 are not an alkoxy group. The at least one synergist has the formula

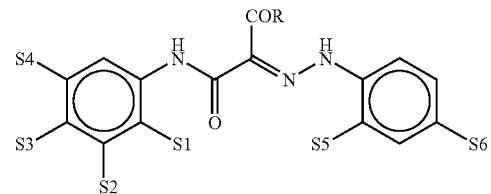

wherein S1-S6 are substituent groups of the synergist, at least one of S2-S4 comprises an ionic or ionizable group, S5=P5, and S6=P6. For both the colorant and the synergist, R is a C1-C6 alkyl group, and, in particular, is a methyl group.

It is to be understood that both the foregoing general description and the following detailed description are exemplary and explanatory only and are intended to provide further explanation of the present invention, as claimed.

DETAILED DESCRIPTION OF THE INVENTION

The present invention relates to inkjet ink compositions comprising an azo pigment.

The inkjet ink composition of the present invention comprises a liquid vehicle, at least one azo pigment, and at least one synergist. The liquid vehicle can be either an aqueous vehicle, which is a vehicle that contains greater than 50% by weight water, or a non-aqueous liquid vehicle, which is a vehicle that contains less than or equal to 50% by weight water or is not miscible with water. Preferably, the vehicle is an aqueous vehicle and can be, for example, water or mixtures of water with water miscible solvents such as alcohols. For example, the aqueous vehicle may be water.

Organic colored pigments comprise water insoluble colorants and can be classified by their colorant type. The inkjet ink composition of the present invention comprises at least one azo pigment, which, as described above, is a specific class of colored pigments, generally falling in the yellow, orange, or red color space. Combinations of azo pigments may also be used. Azo pigments comprise colorants that are typically prepared by combining a diazonium salt (the pigment diazo component) and a compound capable of reacting with a diazonium salt (the pigment azo coupling component). The azo pigment used in the present invention comprises a colorant that is the reaction product of a substituted aryl diazonium salt, formed from an arylamine, and an acylacetamidobenzene derivative, such as an acetoacetamidobenzene derivative, and has the formula:

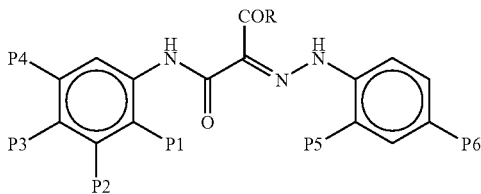

wherein P1-P6 are substituent groups of the colorant of the azo pigment and R in this formula is a C1-C6 alkyl group, preferably a methyl group. In particular, P1-P4 are substitutents from the azo coupling component used to prepare the colorant while P5-P6 are substituents from the diazo component. Thus, the azo pigment used in the inkjet ink composition of the present invention is prepared by the reaction of an aryl diazonium salt, prepared by diazotization of an aryl amine having the formula

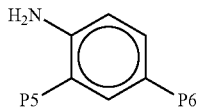

and an azo coupling component having the formula

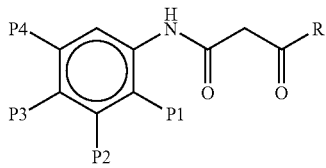

The substituent groups P1-P6 of the colorant can vary. In particular, the substituent groups P2, P3, P4, and P6 of the colorant can be any of those known in the art, including, for example, H, a halogen (such as Cl), an alkyl group (such as a $CH_3$ group), an alkoxy group (such as a $OCH_3$ or $OCH_2CH_3$ group), an amide group (such as a $NHCOCH_3$ or a $CONH_2$ group), or an $NO_2$ group, depending on the desired color shade for the inkjet ink composition. However, for the present invention, neither P1 nor P5 are an alkoxy group such as a methoxy or ethoxy group. Thus, while the colorant of the azo pigment may include an alkoxy substituent resulting from either the diazo component or the azo coupling component, the colorant does not have an alkoxy group in a position ortho to either the azo group or the amide group in the formula shown above. Specific examples of suitable azo pigments include Pigment Yellow 1, Pigment Yellow 1:1, Pigment Yellow 2, Pigment Yellow 3, Pigment Yellow 4, Pigment Yellow 5, Pigment Yellow 6, Pigment Yellow 9, Pigment Yellow 75, Pigment Yellow 98, and Pigment Yellow 116, as well as combinations of these pigments, which can provide a desirable balance of color properties. These are shown in Table 1 below.

TABLE 1

| Pigment | P1 | P2 | P3 | P4 | P5 | P6 |
|---|---|---|---|---|---|---|
| PY 1 | H | H | H | H | $NO_2$ | Me |
| PY 1:1 | H | H | H | H | $NO_2$ | OMe |
| PY 2 | Me | H | Me | H | $NO_2$ | Cl |
| PY 3 | Cl | H | H | H | $NO_2$ | Cl |
| PY 4 | H | H | H | H | H | $NO_2$ |
| PY 5 | H | H | H | H | $NO_2$ | H |
| PY 6 | H | H | H | H | $NO_2$ | Cl |
| PY 9 | Me | H | H | H | $NO_2$ | Me |
| PY 75 | H | H | OEt | H | $NO_2$ | Cl |
| PY 98 | Me | H | Cl | H | $NO_2$ | Cl |
| PY 116 | H | H | NHAc | H | Cl | $CONH_2$ |

Other suitable pigments will be known to one skilled in the art. Preferred pigments due to cost and availability include Pigment Yellow 1, Pigment Yellow 1:1, Pigment Yellow 6, Pigment Yellow 9, or combinations thereof. Surprisingly, it has been found that these specific types of azo pigments, when combined with a suitable synergist discussed in more detail below, can be used to prepare an inkjet ink composition having unexpected stability in a variety of different types of liquid vehicles and, as a result, provide the ink maker with considerable formulation flexibility.

The inkjet ink composition of the present invention also further comprises at least one synergist. Since the pigment is not a modified pigment, that is, a pigment that has been reacted with a surface treating agent and thus comprises at least one attached organic group, the synergist is added in order to provide a stable dispersion of the azo pigment in the liquid vehicle. Thus, as used herein, a synergist is a material that is added separate from the azo pigment (i.e., external to the pigment) into the inkjet ink composition in order to obtain and/or maintain a stable dispersion of the modified azo pigment. The synergist is therefore not a material produced during the preparation of the pigment using, for example, known mixed coupling techniques.

For the present invention, the synergist has the formula

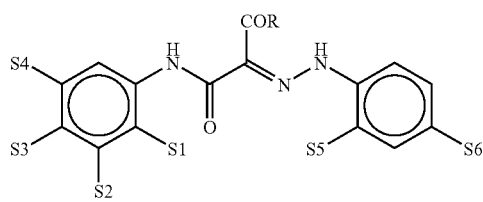

wherein S1-S6 are substituent groups of the synergist and R in this formula is a C1-C6 alkyl group, preferably a methyl group. Thus, the synergist is an azo compound that is structurally similar to the colorant of the azo pigment and, like the colorant, can be prepared by combining a diazonium salt (the synergist diazo component) and a compound capable of reacting with a diazonium salt (the synergist azo coupling component). For the present invention, the synergist comprises the reaction product of a substituted aryl diazonium salt, formed from an arylamine, and an acylacetamidobenzene derivative, such as an acetoacetamidobenzene derivative. In particular, S1-S4 are substitutents from the azo coupling component while S5-S6 are substituents from the diazo component. Thus, the synergist used in the inkjet ink composition of the present invention is prepared by the reaction of an aryl diazonium salt, prepared by diazotization of an aryl amine having the formula

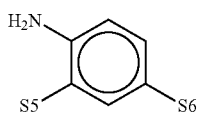

and an azo coupling component having the formula

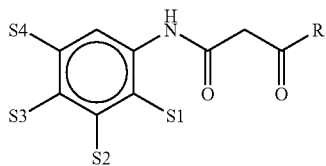

Similar to the substituent groups P1-P6 of the colorant of the azo pigment, the substituent groups S1-S6 of the synergist can also vary. In particular, the substituent groups S2, S3, S4, and S6 of the synergist can be, for example, any of the groups described above for P2, P3, P4, and P6. However, for the present invention, neither S1 nor S5 is an alkoxy group such as a methoxy or ethoxy group. Thus, while the synergist may include an alkoxy substituent resulting from either the diazo component or the azo coupling component, the synergist does not have an alkoxy group in a position ortho to either the azo group or the amide group in the formula shown above.

Regarding the diazo component of the synergist, for the present invention substituent group S5 is the same as substituent group P5 of the azo pigment colorant and substituent group S6 is the same as substituent group P6 of the azo pigment colorant. Thus, the synergist and the azo pigment are prepared using the same diazo component, such as a diazotized arylamine. Since P5 is not an alkoxy group, therefore, S5 is also not an alkoxy group, as noted above. Surprisingly it has been found that, by matching the diazo component of the synergist and the colorant of the azo pigment, improved dispersion stability in a variety of liquid vehicles results.

Regarding the azo coupling component of the synergist, for the present invention substituent groups S1-S4 can be the same or different than substituent groups P1-P4 of the colorant of the pigment. Preferably at least one of substituent group S1-S4, such as two or three groups, is the same as the corresponding substituent group P1-P4. For example, group S1 can be the same as P1 and/or S2 can be the same as P2. The more similar in structure the synergist is to the colorant, the closer in color the synergist will be to the azo pigment. In addition, improved dispersion properties have also been found. However, while the diazo component of the synergist is the same as the diazo component of the colorant of the pigment, the azo coupling component does not need to be the same as that of the colorant of the pigment, although it is preferred to be similar.

In addition, at least one of substituent groups S2, S3, or S4 comprises at least one ionic or ionizable group. For example, S3 may be a substituent group comprising at least one ionic group or at least one ionizable group (i.e., a group that, when used in the inkjet ink composition, forms an ionic group). Thus, while both the colorant of the azo pigment and the synergist have similar structures and can be prepared in a similar manner, the synergist is water soluble due to the presence of at least one ionic or ionizable group. An ionic group is either anionic or cationic and is associated with a counterion of the opposite charge including inorganic or organic counterions such as $Na^+$, $K^+$, $Li^+$, $NH_4^+$, $NR_4^+$, acetate, $NO_3^-$, $SO_4^{-2}$, $RSO_3^-$, $ROSO_3^-$, $OH^-$, and $Cl^-$, where R in these counterions represents hydrogen or an organic group such as a substituted or unsubstituted aryl and/or alkyl group. An ionizable group is one that is capable of forming an ionic group in the medium of use. Organic ionic groups include those described in U.S. Pat. No. 5,698,016, the description of which is fully incorporated herein by reference.

Anionic groups are negatively charged ionic groups that may be generated from groups having ionizable substituents that can form anions (anionizable groups), such as acidic substituents. They may also be the anion in the salts of ionizable substituents. Representative examples of anionic groups include —COO—, —$SO_3^-$, —$OSO_3^-$, —$HPO_3^-$, —$OPO_3^{-2}$, and —$PO_3^{-2}$. Representative examples of anionizable groups include —COOH, —$SO_3H$, —$PO_3H_2$, —R'SH, —R'OH, and —$SO_2NHCOR'$, where R' in these groups represents hydrogen or an organic group such as a substituted or unsubstituted aryl and/or alkyl group. Preferably, the anionic or anionizable group is a carboxylic acid group, a sulfonic acid group, a phosphonic acid group, or salts thereof.

Cationic groups are positively charged organic ionic groups that may be generated from ionizable substituents that can form cations (cationizable groups), such as protonated amines. For example, alkyl or aryl amines may be protonated in acidic media to form ammonium groups —$NR'_2H^+$, where R' in this group represents an organic group such as a substituted or unsubstituted aryl and/or alkyl group. Preferably, the cationic or cationizable group is an amine group or salt thereof or an ammonium group.

As a particular example, at least one of substituent groups S2, S3, or S4 can comprise at least one geminal bisphosphonic acid group, partial esters thereof, or salts thereof—that is, the substituent group can comprise at least two phosphonic acid groups, partial esters thereof, or salts thereof that are directly bonded to the same carbon atom. Such a group may also be referred to as a 1,1-diphosphonic acid group, partial ester thereof, or salt thereof. By "partial ester thereof" is meant that the phosphonic acid group may be a partial phosphonic acid ester group having the formula —$PO_3AH$, or a salt thereof, wherein A is an aryl, alkaryl, aralkyl, or alkyl group. Either or both of the phosphonic acid groups of the substituent group may be a partial phosphonic acid ester group. Also, one of the phosphonic acid groups may be a phosphonic acid ester having the formula —$PO_3A_2$ while the other phosphonic acid group may be a partial phosphonic acid ester group, a phosphonic acid group, or a salt thereof. However, it is preferred that at least one of the phosphonic acid groups is a salt of a phosphonic acid or a partial ester thereof.

For example, at least one of the substituent groups S2, S3, or S4 may comprise a group having the formula —$CQ(PO_3H_2)_2$, partial esters thereof, or salts thereof. Q is bonded to the geminal position and may be H, R', OR', SR', or $NR'_2$ wherein R' for these groups, which can be the same or different, is H, a C1-C18 saturated or unsaturated, branched or unbranched alkyl group, a C1-C18 saturated or unsaturated, branched or unbranched acyl group, an aralkyl group, an alkaryl group, or an aryl group. For example, Q may be H, R', OR', SR', or $NR'_2$, wherein R', which can be the same or different, is H, a C1-C6 alkyl group, or an aryl group. Preferably Q is H, OH, or $NH_2$. Furthermore, one of these substituent groups may comprise a group having the formula —$(CH_2)_n$—$CQ(PO_3H_2)_2$, partial esters thereof, or salts thereof, wherein Q is as described above and n is 0 to 9, such as 1 to 9. Preferably n is 0 to 3, such as 1 to 3.

As a further example, at least one of the substituent groups S2, S3, or S4 may comprise a group having the formula —CR"(PO$_3$H$_2$)$_2$, partial esters thereof, or salts thereof. In this formula, R" is H or a C1-C6 alkyl group, such as a methyl or ethyl group, but is preferably H. For example, the organic group may comprise a group having the formula —CO—Z—CH(PO$_3$H$_2$)$_2$ or —SO$_2$—Z—CH(PO$_3$H$_2$)$_2$, partial esters thereof, or salts thereof, wherein Z is O, S, or NR' and R' is H, a C1-C18 alkyl group, a C1-C18 acyl group, an aralkyl group, an alkaryl group, or an aryl group. Preferably, Z is NH, and, thus, the substituent group comprises at least one alkyl amide group wherein the alkyl group is a geminal bisphosphonic acid group, partial esters thereof, or salts thereof.

As discussed above, at least one of the substituent groups S2, S3, or S4 comprises at least one geminal bisphosphonic acid group, partial esters thereof, or salts thereof. By "salt" is meant that the phosphonic acid group is in a partially or fully ionized form having a cationic counterion. Either or both of the phosphonic acid groups of the organic group may be in either a partially or fully ionized form. Thus, at least one these substituent groups may comprise at least one geminal bisphosphonic acid group, wherein either or both phosphonic acid groups have the formula —PO$_3$H$^-$ M$^+$ (monobasic salt) or —PO$_3^{-2}$ M$^{+2}$ (dibasic salt). Also, one phosphonic acid group may have the formula —PO$_3$H$_2$. In these formulas, M$^+$ is a cation such as Na$^+$, K$^+$, Li$^+$, or NR$_4^+$, wherein R of these cations, which can be the same or different, represents hydrogen or an organic group such as a substituted or unsubstituted aryl and/or alkyl group.

Thus, the inkjet ink composition of the present invention comprises at least one azo pigment and at least one synergist having an azo structure similar to that of the colorant of the pigment. The diazo component of both the colorant of the pigment and the synergist are the same, and neither have an alkoxy group that is ortho to the azo group of their structure. Furthermore, the azo coupling component of the colorant and that of the synergist also do not have an alkoxy group that is ortho to the amide group of their structure. In addition, the azo coupling component of the synergist comprises at least one ionic or ionizable group.

The inkjet ink composition can also comprise more than one azo pigment and more than one synergist. However, the structural relationships discussed above must also apply to these blends. For example, if the inkjet ink composition comprises two azo pigments, each having a different diazo component for the colorant, the inkjet ink composition also comprises at least two synergists, at least one having the diazo component of the first azo pigment and at least one having the diazo component of the second azo pigment. If a combination of two azo pigments are used that have the same diazo component, than only one synergist is needed, which should also have the same diazo component. Also, more than one synergist can be used for a one pigment, as long as the diazo components of each synergist are the same as the diazo component of the colorant of the azo pigment. Other combinations and blends of pigments and synergists are also possible, meeting the structural relations provided above.

The amount of each component of the inkjet ink composition can be varied, depending on the desired properties of the ink and/or resulting printed image. In particular, the amount of azo pigment can be varied but is typically in an amount ranging from about 0.1% to about 20% based on the weight of the inkjet ink composition. The amount of the synergist may also be varied but is typically in an amount of from about 0.5% to about 10% by weight based on the weight of the pigment, preferably from about 1.0% to about 8%, and more preferably between about 2.0% and about 6% by weight based on the weight of the pigment.

The inkjet ink composition of the present invention can be formed with a minimum of additional components (additives and/or cosolvents) and processing steps. However, suitable additives may also be incorporated into these inkjet ink compositions to impart a number of desired properties while maintaining the stability of the compositions. For example, surfactants may be added to further enhance the colloidal stability of the composition. Other additives are well known in the art and include humectants, biocides and fungicides, binders such as polymeric binders, pH control agents, drying accelerators, penetrants, and the like. The amount of a particular additive will vary depending on a variety of factors but are generally present in an amount ranging between 0% and 40% based on the weight of the inkjet ink composition. Additionally, the inkjet ink compositions of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like. It is also within the bounds of the present invention to use colored pigments not meeting the specified structural requirements described above, along with the specific azo yellow pigment and synergist combination in order, for example, to produce a different shade of yellow (such as a redder or greener shade) or to improve the strength of the yellow color.

It has surprisingly been found that inkjet ink compositions comprising the combination of the specific types of azo pigments and specific types of suitable synergist, discussed in more detail above, have unexpected stability in a variety of different types of liquid vehicles, even vehicles comprising various types of additives known in the art. Furthermore, these compositions surprisingly also maintain their stability over time, as can be observed through aging studies. Thus, the combination of specific azo pigments and synergists enable the preparation of inkjet ink compositions that are stable in a variety of different formulations.

The present invention will be further clarified by the following examples which are intended to be only exemplary in nature.

EXAMPLES

The following general procedures were used to prepare inkjet ink compositions of the present invention.
Preparation of Diazonium Solutions Solutions of diazonium salts were prepared from the corresponding aromatic amines using the procedure shown in Scheme 1 below.

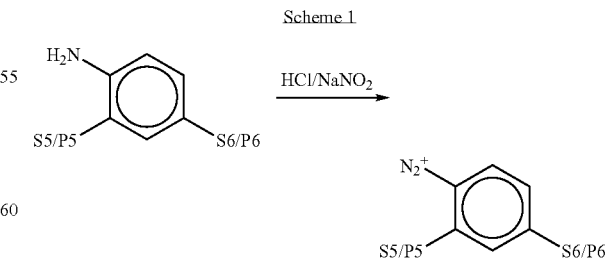

Thus, to a 500 mL conical flask was added 108 mmol of an aromatic amine (or mixture of aromatic amines), 250 mL of ice water, and 237 mmol of concentrated hydrochloric acid (27.1 mL of a 37% solution). The mixture was chilled in ice with stirring and diazotized by adding of 55 mL of an aqueous 2M sodium nitrite solution. After 1 hour of stirring, diazotization was complete and excess free nitrous acid was destroyed with 0.5 g of solid sulfamic acid. The resulting diazonium solution was kept on ice and used within 1 hour of preparation. This diazonium solution was used to prepare both the synergist and the azo pigment, thus ensuring that the diazo component of these materials are the same (i.e., S5=P5 and S6=P6).

to 8 mmol of diazonium salt was added dropwise, and a yellow slurry formed almost immediately. The resulting synergist (or mixture of synergists) slurry was found to be essentially pure by HPLC and was used as is to form inkjet ink compositions, described below. Alternatively, the synergist could also be separated by filtration, washed with ice water, and dried in vacuum oven at 70° C.

The synergists shown in Table 2 below were prepared using this general method.

TABLE 2

Synergists

| ID | S1 | S2 | S3 | S4 | S5 | S6 |
|---|---|---|---|---|---|---|
| Syn1 | H | H | $SO_3Na$ | H | $NO_2$ | Me |
| Syn2 | H | H | $SO_3Na$ | H | $NO_2$ | Cl |
| Syn3 | H | H | $SO_3Na$ | H | $NO_2$ | OMe |
| Syn4 | H | H | $CO_2Na$ | H | $NO_2$ | Me |
| Syn5 | H | H | $SO_2NHCH(PO_3H_2)_2$, Na salt | H | $NO_2$ | Me |
| Syn6 | H | H | $CONHCH(PO_3H_2)_2$, Na salt | H | $NO_2$ | Me |
| Syn7 | H | H | $CH_2C(OH)(PO_3H_2)_2$, Na salt | H | $NO_2$ | Me |
| Syn8 | H | H | $SO_2NH(CH_2)_3C(OH)(PO_3H_2)_2$, Na salt | H | $NO_2$ | Me |
| Syn9 | H | H | H | $SO_3Na$ | $NO_2$ | Me |
| Syn10 | H | H | $SO_2NHCH(PO_3H_2)_2$, Na salt | H | $NO_2$ | OMe |
| Syn11 | H | H | $CONHCH(PO_3H_2)_2$, Na salt | H | $NO_2$ | OMe |
| Syn12 | H | H | $SO_3Na$ | H | OMe | $NO_2$ |
| Syn13 | H | H | H | H | $NO_2$ | $CO_2Na$ |
| Syn14 | OMe | H | H | $SO_3Na$ | $NO_2$ | Me |
| Syn15 | H | H | $SO_2NHCH(PO_3H_2)_2$, Na salt | H | OMe | $NO_2$ |
| Syn16 | OMe | H | H | $SO_3Na$ | OMe | $NO_2$ |
| Syn17 | OMe | H | H | H | H | $SO_3Na$ |
| Syn18 | OMe | H | H | H | $NO_2$ | $SO_3Na$ |

Preparation of Synergists

Azo coupling components having an ionic or ionizable group were prepared using the procedure described in U.S. Pat. No. 2,328,353 by reaction of a suitable aromatic amine and diketene in water at 3-5° C. at pH 8-10, as shown in Scheme 2 below.

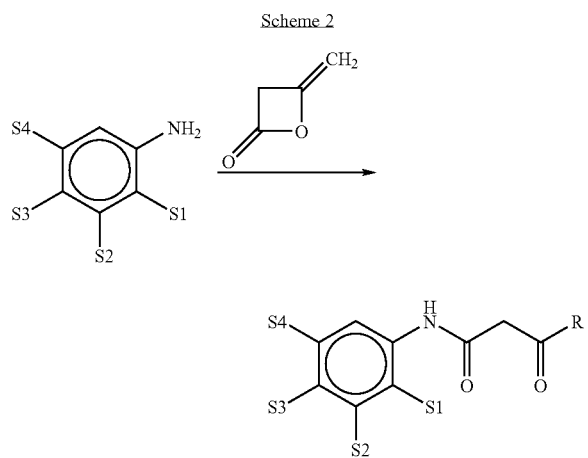

Scheme 2

Yields were determined by LC-MS and were found to be nearly quantitative. The resulting synergist azo coupling components were used as aqueous solutions and measured volumetrically.

An amount of the synergist azo coupling component solution corresponding to 8 mmol of coupler was placed in a 250 mL conical flask containing 1 g of anhydrous sodium acetate. To this, an amount of the diazonium solution corresponding Synthesis of Azo Pigments Acetoacetanilide (103 mmol, 18.4 g, 99% purity) was added to a 4-neck round-bottom flask containing 380 mL of DI water and 126 mL of a 1M aqueous solution of sodium hydroxide. After stirring for 15 minutes, a clear solution of acetoacetanilide sodium salt formed. Then, 49 mL of a 2.6M aqueous solution of acetic acid was metered in using peristaltic pump to reprecipitate the pigment azo coupling component in the form of fine crystals. Finally, 18 grams of anhydrous sodium acetate was added to the resulting coupler slurry.

To this coupler slurry, an amount of diazonium solution corresponding to 100 mmol of diazonium salt was added at room temperature over 1.5 hours using a peristaltic pump. After the addition was complete, no diazonium salt was detected using an H-acid test (0.1 g of H-acid and 0.1 g of sodium bicarbonate dissolved in 10 mL DI water), which turns violet in the presence of diazonium salts. The resulting yellow azo pigment was removed by vacuum filtration, and the presscake was then washed with DI water until the filtrate conductivity was 200-250 microsiemens. This was used without further purification to form inkjet ink compositions, described below.

The azo pigments shown in Table 3 below were prepared using this general method. Where appropriate, common names for these pigments (such as C.I numbers) are also shown.

TABLE 3

Azo Pigments

| ID | C.I.# | P1 | P2 | P3 | P4 | P5 | P6 |
|---|---|---|---|---|---|---|---|
| Azo1 | PY1 | H | H | H | H | $NO_2$ | Me |
| Azo2 | PY6 | H | H | H | H | $NO_2$ | Cl |

TABLE 3-continued

| | | Azo Pigments | | | | | |
|---|---|---|---|---|---|---|---|
| ID | C.I.# | P1 | P2 | P3 | P4 | P5 | P6 |
| Azo3 | PY1:1 | H | H | H | H | $NO_2$ | OMe |
| Azo4 | none | H | H | H | H | OMe | $NO_2$ |
| Azo5 | PY203 | OMe | H | H | H | $NO_2$ | Me |
| Azo6 | PY74 | OMe | H | H | H | OMe | $NO_2$ |

Preparation of Azo Pigment Dispersions

Various azo pigments, prepared as described above, were combined with various synergists, prepared as described above, and water was added to bring the solids to 15-17%. Thus, the synergist is used in an amount of 8% based on the weight of the azo pigment. If multiple azo pigments and/or multiple synergists were used, the total amount of synergist is 8% based on the total weight of the azo pigment, and the ratio of synergists is the same as the ratio of azo pigments.

Once combined, the resulting mixture was then homogenized at for 2 hours 65-70° C. using a Silverson LR-4 overhead mixer and external heat (hot plate). Immediately after this, the resulting dispersion was sonicated for 3 hours using Misonix sonicator. In order to remove residual salts, the dispersion was then subjected to diafiltration using a hollow fiber membrane until the permeate conductivity decreased to 200-500 microsiemens. Finally, the aqueous azo pigment dispersions were centrifuged at 4500 RPM for 40 minutes to remove coarse particles.

Compositions for heat aging tests were prepared with these aqueous azo pigment dispersions using one of the formulations shown in Table 4 or Table 5 below (the weight percent pigment is the amount of the azo pigment/synergist combination on a dry basis).

TABLE 4

| Formulation A | |
|---|---|
| Component | Weight % |
| pigment | 4 |
| triethylene glycol monobutyl ether | 10 |
| water | 86 |

TABLE 5

| Formulation B | |
|---|---|
| Component | Weight % |
| pigment | 4 |
| 1,2-hexanediol | 10 |
| water | 86 |

The mean volume pigment particle sizes (mV) for the resulting compositions were measured using a Nanotrac 250 dynamic light scattering particle analyzer manufactured by Microtrac Inc. If stable, the compositions were further subjected to heat aging by heating them at 70° C. in a convection oven for 3 weeks, after which time the mean volume particle size was measured again and compared to the initial particle size.

Compositions were rated as follows: A—median particle size growth 5-10%; no sedimentation; B—median particle size growth 11-20%; little or no sedimentation; C—median particle size growth over 20%, sedimentation; D—catastrophic failure—full separation; and E—no dispersion formed; material can not be tested. A rating of A or B would be considered to be passing the heat aging test while a rating of C or lower would be considered to be failing the test.

Examples 1-4

Azo pigment dispersions of the present invention were prepared using the general procedure described above. The specific combinations of synergist and azo pigments for each example are shown in Table 6 below.

TABLE 6

| Ex | Pigment Synergist | P1 S1 | P2 S2 | P3 S3 | P4 S4 | P5 S5 | P6 S6 |
|---|---|---|---|---|---|---|---|
| 1 | PY1 | H | H | H | H | $NO_2$ | Me |
|   | Syn1 | H | H | $SO_3Na$ | H | $NO_2$ | Me |
| 2 | PY6 | H | H | H | H | $NO_2$ | Cl |
|   | Syn2 | H | H | $SO_3Na$ | H | $NO_2$ | Cl |
| 3 | PY1 | H | H | H | H | $NO_2$ | Me |
|   | Syn1 | H | H | $SO_3Na$ | H | $NO_2$ | Me |
|   | PY6 | H | H | H | H | $NO_2$ | Cl |
|   | Syn2 | H | H | $SO_3Na$ | H | $NO_2$ | Cl |
| 4 | PY1 | H | H | H | H | $NO_2$ | Me |
|   | Syn1 | H | H | $SO_3Na$ | H | $NO_2$ | Me |
|   | PY1:1 | H | H | H | H | $NO_2$ | OMe |
|   | Syn3 | H | H | $SO_3Na$ | H | $NO_2$ | OMe |

As can be seen, each composition comprises an azo pigment that does not have an alkoxy group in the P1 or P5 positions and a synergist having an ionic or ionizable group in the S3 position, which, for each of these examples, is a sodium sulfonate group. In addition, for each of these examples, the diazo components of both the azo pigment and the synergist are the same (i.e., S5=P5 and S6=P6). Furthermore, for Examples 3 and 4, two azo pigments are used, each having the required structural features, along with a suitable synergist also meeting the required structural features. For Example 3, Pigment Yellow 1 and Pigment Yellow 6 are used in a 50/50 ratio by weight, and, for Example 4, Pigment Yellow 1 and Pigment Yellow 1:1 are used in an 80/20 ratio by weight. A corresponding ratio of synergists is also used, and the total amount of synergist is 8% based on the total weight of the azo pigment.

Compositions for heat aging tests were prepared using both Formulation A and Formulation B, and the heat aging rating for each are shown in Table 7 below.

TABLE 7

| Ex # | Formulation A | Formulation B |
|---|---|---|
| 1 | A | A |
| 2 | A | A |
| 3 | A | A |
| 4 | A | A |

As these results show, each of these azo pigment dispersions, comprising the proper choices of azo pigment(s) and synergist(s), have excellent heat stability in both formulations and, as a result, would be expected to form inkjet ink compositions that jet reliably in an inkjet ink printer.

Examples 5-10

Azo pigment dispersions of the present invention were prepared using the general procedure described above. The specific combinations of synergist and azo pigments for each example are shown in Table 8 below. As can be seen, each composition comprises Pigment Yellow 1, which is an azo pigment that does not have an alkoxy group in the P1 or P5 positions, and a synergist having an ionic or ionizable group in either the S3 (Examples 5-9) or S4 position (Example 10). For each of these examples, a variety of different groups are used, and, furthermore, the diazo components of both the azo pigment and the synergist are the same (i.e., S5=P5 and S6=P6). The total amount of synergist is 8% based on the total weight of the azo pigment.

TABLE 8

| Ex | Pigment Synergist | P1 S1 | P2 S2 | P3 S3 | P4 S4 | P5 S5 | P6 S6 |
|---|---|---|---|---|---|---|---|
| 1 | PY1 | H | H | H | H | $NO_2$ | Me |
|  | Syn1 | H | H | $SO_3Na$ | H | $NO_2$ | Me |
| 5 | PY1 | H | H | H | H | $NO_2$ | Me |
|  | Syn4 | H | H | $CO_2Na$ | H | $NO_2$ | Me |
| 6 | PY1 | H | H | H | H | $NO_2$ | Me |
|  | Syn5 | H | H | $SO_2NHCH(PO_3H_2)_2$, Na salt | H | $NO_2$ | Me |
| 7 | PY1 | H | H | H | H | $NO_2$ | Me |
|  | Syn6 | H | H | $CONHCH(PO_3H_2)_2$, Na salt | H | $NO_2$ | Me |
| 8 | PY1 | H | H | H | H | $NO_2$ | Me |
|  | Syn7 | H | H | $CH_2C(OH)(PO_3H_2)_2$, Na salt | H | $NO_2$ | Me |
| 9 | PY1 | H | H | H | H | $NO_2$ | Me |
|  | Syn8 | H | H | $SO_2NH(CH_2)_3C(OH)(PO_3H_2)_2$ Na salt | H | $NO_2$ | Me |
| 10 | PY1 | H | H | H | H | $NO_2$ | Me |
|  | Syn9 | H | H | H | $SO_3Na$ | $NO_2$ | Me |

Compositions for heat aging tests were prepared using both Formulation A and Formulation B, and the heat aging rating for each are shown in Table 9 below.

TABLE 9

| Ex # | Formulation A | Formulation B |
|---|---|---|
| 1 | A | A |
| 5 | B | B |
| 6 | B | B |
| 7 | B | B |
| 8 | B | B |
| 9 | B | B |
| 10 | A | A |

As these results show, each of these azo pigment dispersions, comprising the proper choices of azo pigment and synergist, have excellent heat stability in both formulations and, as a result, would be expected to form inkjet in ink compositions that jet reliably in an inkjet ink printer.

Examples 11-13

Azo pigment dispersions of the present invention were prepared using the general procedure described above. The specific combinations of synergist and azo pigments for each example are shown in Table 10 below.

TABLE 10

| Ex | Pigment Synergist | P1 S1 | P2 S2 | P3 S3 | P4 S4 | P5 S5 | P6 S6 |
|---|---|---|---|---|---|---|---|
| 4 | PY1 | H | H | H | H | $NO_2$ | Me |
|  | Syn1 | H | H | $SO_3Na$ | H | $NO_2$ | Me |
|  | PY1:1 | H | H | H | H | $NO_2$ | OMe |
|  | Syn3 | H | H | $SO_3Na$ | H | $NO_2$ | OMe |

TABLE 10-continued

| Ex | Pigment Synergist | P1 S1 | P2 S2 | P3 S3 | P4 S4 | P5 S5 | P6 S6 |
|---|---|---|---|---|---|---|---|
| 11 | PY1 | H | H | H | H | $NO_2$ | Me |
|  | Syn5 | H | H | $SO_2NHCH(PO_3H_2)_2$, Na salt | H | $NO_2$ | OMe |
|  | PY1:1 | H | H | H | H | $NO_2$ | OMe |
|  | Syn10 | H | H | $SO_2NHCH(PO_3H_2)_2$, Na salt | H | $NO_2$ | OMe |

TABLE 10-continued

| Ex | Pigment Synergist | P1 S1 | P2 S2 | P3 S3 | P4 S4 | P5 S5 | P6 S6 |
|---|---|---|---|---|---|---|---|
| 12 | PY1 | H | H | H | H | $NO_2$ | Me |
|  | Syn5 | H | H | $SO_2NHCH(PO_3H_2)_2$, Na salt | H | $NO_2$ | OMe |
|  | PY1:1 | H | H | H | H | $NO_2$ | OMe |
|  | Syn10 | H | H | $SO_2NHCH(PO_3H_2)_2$, Na salt | H | $NO_2$ | OMe |
| 13 | PY1 | H | H | H | H | $NO_2$ | Me |
|  | Syn6 | H | H | $CONHCH(PO_3H_2)_2$, Na salt | H | $NO_2$ | Me |
|  | PY1:1 | H | H | H | H | $NO_2$ | OMe |
|  | Syn11 | H | H | $CONHCH(PO_3H_2)_2$, Na salt | H |  | Me |

As can be seen, each composition comprises the combination of Pigment Yellow 1 and Pigment Yellow 1:1, which are azo pigments that do not have an alkoxy group in the P1 or P5 positions, and a synergist having an ionic or ionizable group in the S3 position. For each of these examples, a variety of different groups are used, and the diazo components of both the azo pigment and the synergist are the same (i.e., S5=P5 and S6=P6). Also, the ratio of azo pigments is varied. For Example 4, Pigment Yellow 1 and Pigment Yellow 1:1 are used in an 80/20 ratio by weight. For Example 11, the pigments are used in a 95/5 ratio by weight. For Example 12, the weight ratio of Pigment Yellow 1 to Pigment Yellow 1:1 is 99/1. For Example 13, Pigment 1 and Pigment 1:1 are used in a ratio of 97.5/2.5. For each of these examples, a corresponding ratio of synergists is also used, and the total amount of synergist is 8% based on the total weight of the azo pigment.

Compositions for heat aging tests were prepared using both Formulation A and Formulation B, and the heat aging ratings for each are shown in Table 11 below.

TABLE 11

| Ex # | Formulation A | Formulation B |
| --- | --- | --- |
| 4 | A | A |
| 11 | B | B |
| 12 | B | B |
| 13 | B | B |

As these results show, each of these azo pigment dispersions, comprising the proper choices of azo pigments and synergists, have excellent heat stability in both formulations and, as a result, would be expected to form inkjet ink compositions that jet reliably in an inkjet ink printer.

Example 14

An azo pigment dispersion was prepared using the general procedure described above. The specific combination of synergist and azo pigment is shown in Table 12 below.

TABLE 12

| Ex | Pigment Synergist | P1 S1 | P2 S2 | P3 S3 | P4 S4 | P5 S5 | P6 S6 |
| --- | --- | --- | --- | --- | --- | --- | --- |
| 14 | PY1 | H | H | H | H | $NO_2$ | Me |
|  | Syn7 | H | H | $CH_2C(OH)(PO_3H_2)_2$, Na salt | H | $NO_2$ | Me |
|  | Syn1 | H | H | $SO_3Na$ | H | $NO_2$ | Me |

As can be seen, this composition comprises Pigment Yellow 1, which is an azo pigment that does not have an alkoxy group in the P1 or P5 positions, and a combination of synergists, each having a different ionic or ionizable group in the S3 position. The diazo components of the azo pigment and synergists are the same (i.e., S5=P5 and S6=P6). Also, the ratio synergists are used in a 1:1 ratio by weight, and the total amount of synergist is 8% based on the weight of the azo pigment.

Compositions for heat aging tests were prepared using both Formulation A and Formulation B, and the heat aging ratings for each are shown in Table 13 below.

TABLE 13

| Ex # | Formulation A | Formulation B |
| --- | --- | --- |
| 14 | B | B |

As these results show, this azo pigment dispersion, comprising the proper choices of azo pigment and synergists, has excellent heat stability in both formulations and, as a result, would be expected to form inkjet ink compositions that jet reliably in an inkjet ink printer.

Example 15

An azo pigment dispersion was prepared as follows. Pigment Yellow 1 (188.35 g, commercially available from Dominion Colour Corporation, Toronto, Canada in the form of a 26.52% solids presscake, equivalent to 50 g pigment), which is an azo pigment that does not have an alkoxy group in the P1 or P5 positions, was added to a stainless steel beaker, followed by 2.00 g of the synergist having an ionic or ionizable group in the S3 position and having the same diazo component as Pigment Yellow 1 (Syn7, prepared as described above, which was filtered, washed with ice water, and dried in vacuum at 70° C.). The mixture was diluted to 17% solids with 310 g of DI water and homogenized for 2 hours in a Silverson mixer at 4500 RPM at a temperature of 75° C., producing a pigment dispersion having a mean volume particle size of 661 nm. The dispersion was then transferred to a chilled vessel and sonicated for 3 hours at 150 W with an immersion probe, giving a dispersion having a mean volume particle size of 199 nm. This was then centrifuged for 40 minutes at 4500 RPM to give a final pigment dispersion having a mean volume particle size of 178 nm, which was subsequently concentrated to 30% solids using membrane diafiltration (AG Tech hollow fiber 500K membrane). Yield based on Pigment Yellow 1 was 65.2%. The specific combination of synergist and azo pigment used in this example is shown in Table 14 below.

TABLE 14

| Ex | Pigment Synergist | P1 S1 | P2 S2 | P3 S3 | P4 S4 | P5 S5 | P6 S6 |
| --- | --- | --- | --- | --- | --- | --- | --- |
| 15 | PY1 | H | H | H | H | $NO_2$ | Me |
|  | Syn7 | H | H | $CH_2C(OH)(PO_3H_2)_2$, Na salt | H | $NO_2$ | Me |

Compositions for heat aging tests were prepared using both Formulation A and Formulation B, and the heat aging ratings for each are shown in Table 15 below.

TABLE 15

| Ex # | Formulation A | Formulation B |
| --- | --- | --- |
| 15 | B | B |

As these results show, this azo pigment dispersion, comprising the proper choice of azo pigment and synergist, has excellent heat stability in both formulations and, as a result, would be expected to form inkjet ink compositions that jet reliably in an inkjet ink printer.

Comparative Examples 1-14

The following comparative examples describe inkjet ink compositions comprising azo pigments and synergists in combination which do not have the specific structural features described above relating to inkjet ink compositions of the present invention.

Comparative Example 1

A comparative azo pigment dispersion was prepared using the general procedure described above. The specific combination of synergist and azo pigment is shown in Table 16 below.

TABLE 16

| Ex | Pigment Synergist | P1 S1 | P2 S2 | P3 S3 | P4 S4 | P5 S5 | P6 S6 |
| --- | --- | --- | --- | --- | --- | --- | --- |
| Comp Ex 1 | Azo4 | H | H | H | H | OMe | $NO_2$ |
|  | Syn12 | H | H | $SO_3Na$ | H | OMe | $NO_2$ |

As can be seen, this comparative composition comprises an azo pigment that has a methoxy group in the P5 position, which is combined with a synergist having an ionic or ionizable group in the S3 position and having the same diazo component as the azo pigment (i.e., S5=P5 and S6=P6). The total amount of synergist is 8% based on the weight of the azo pigment.

Comparative compositions for heat aging tests were prepared using both Formulation A and Formulation B, and the heat aging ratings for each are shown in Table 17 below.

TABLE 17

| Ex # | Formulation A | Formulation B |
|---|---|---|
| Comp Ex 1 | E | E |

As these results show, a combination of azo pigment and synergist meeting all of the structural characteristics described above except having an alkoxy group in the P5 position of the azo pigment, does not form stable dispersions in either formulation. As a result, this azo pigment dispersion would not be expected to form inkjet ink compositions that jet reliably in an inkjet ink printer.

Comparative Example 2

A comparative azo pigment dispersion was prepared using the following mixed coupling method.

The diazonium solution used to prepare the azo pigment and synergist of Example 7 was prepared using the procedure described above. Then, acetoacetanilide was reprecipitated as described above, and this was combined with the azo coupling component used to prepare Syn6, to form a mixture of azo couplers. To this was added all of the formed diazonium solution. The reaction mixture was heated at 80° C. for 2 hours, and the resulting yellow pigment presscake was removed by filtration, redispersed in water, sonicated, diafiltered, and centrifuged. Thus, the resulting azo pigment dispersion comprised Pigment Yellow 1 and Syn6, prepared as an intimate mixture by a mixed coupling procedure. The total amount of synergist is 8% based on the weight of the azo pigment.

Comparative compositions for heat aging tests were prepared using both Formulation A and Formulation B, and the heat aging ratings for each are shown in Table 18 below.

TABLE 18

| Ex # | Formulation A | Formulation B |
|---|---|---|
| Comp Ex 2 | C | C |

These comparative azo pigment dispersions contained the same azo pigment and synergist as in Example 7, with the exception that the synergist is not a separately added component (rather it is prepared during the synthesis of the azo pigment). However, as the results in Table 18 show, these compositions have considerably poorer heat stability in both formulations. Thus, this comparative azo pigment dispersion would not be expected to form inkjet ink compositions that jet reliably in an inkjet ink printer.

Comparative Example 3

A comparative azo pigment dispersion was prepared using the general procedure described above. The specific combination of synergist and azo pigment is shown in Table 19 below.

TABLE 19

| Ex | Pigment Synergist | P1 S1 | P2 S2 | P3 S3 | P4 S4 | P5 S5 | P6 S6 |
|---|---|---|---|---|---|---|---|
| Comp Ex 3 | PY1 | H | H | H | H | NO$_2$ | Me |
|  | Syn13 | H | H | H | H | NO$_2$ | CO$_2$Na |

As can be seen, this comparative composition comprises Pigment Yellow 1, which is an azo pigment that does not have a methoxy group in the P1 or P5 position, and a synergist that does not have an ionic or ionizable group in any of the S2-S4 positions. Rather, the ionic group (a sodium carboxylate group) is in the S6 position. Also, as a result, the same diazo component of the synergist is different from that of the azo pigment (i.e., S5=P5 but S6 P6). The total amount of synergist is 8% based on the weight of the azo pigment.

Comparative compositions for heat aging tests were prepared using both Formulation A and Formulation B, and the heat aging ratings for each are shown in Table 20 below.

TABLE 20

| Ex # | Formulation A | Formulation B |
|---|---|---|
| Comp Ex 3 | C | C |

As these results show, this comparative azo pigment dispersion, comprising a combination of azo pigment and synergist meeting all of the structural characteristics described above, except having the ionic or ionizable group in a different position for the synergist, have considerably poorer heat stability. As a result, this comparative azo pigment dispersion would not be expected to form inkjet ink compositions that jet reliably in an inkjet ink printer.

Comparative Example 4

A comparative azo pigment dispersion was prepared using the following procedure.

A diazonium solution was prepared using 2-nitro-4-methylaniline using the procedure described above. A synergist azo coupling component was prepared by combining sodium alendronate and diketene, as shown in Scheme 3 below using the general procedure described above.

Scheme 3

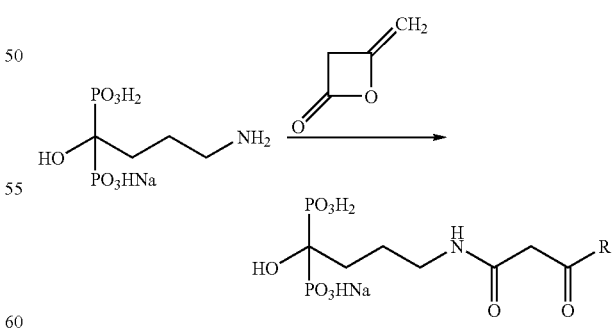

This synergist azo coupling component was used to prepare a synergist using the diazonium solution, following the general procedure described above. In addition, Pigment Yellow 1 was also prepared using this diazonium solution, using the general procedure described above. Finally, a comparative azo pigment dispersion was prepared, also using the general procedure described above, with the exception that the amount of the synergist was 6% based on the weight of the azo pigment.

Comparative compositions for heat aging tests were prepared using both Formulation A and Formulation B, and the heat aging ratings for each are shown in Table 21 below.

TABLE 21

| Ex # | Formulation A | Formulation B |
|---|---|---|
| Comp Ex 4 | D | D |

As these results show, this comparative azo pigment dispersion, comprising a combination of azo pigment meeting all of the structural characteristics described above in combination with a synergist having an ionic or ionizable group but not having the same azo coupling component as the azo pigment, has considerably poorer heat stability in both formulations. As a result, these comparative azo pigment dispersions would not be expected to form inkjet ink compositions that jet reliably in an inkjet ink printer.

Comparative Examples 5-13

Comparative azo pigment dispersions were prepared using the general procedure described above. The specific combination of synergist and azo pigment is shown in Table 22 below. As can be seen, each of these comparative compositions comprise an azo pigment that has a methoxy group in the P1 and/or P5 positions (Pigment Yellow 203, for Comparative Examples 5-7, has a methoxy group in position P1 while Pigment Yellow 74, for Comparative Examples 8-13, has a methoxy group in both positions P1 and P5), along with a variety of different synergist having an ionic or ionizable group. For Comparative Examples 5-11, the synergist also has the same diazo component as the azo pigment (i.e., S5=P5 and S6=P6). The total amount of synergist is 8% based on the weight of the azo pigment. For Comparative Example 11, which uses a 1:1 mixture of two synergists, the total amount of synergist is 8% based on the weight of the azo pigment.

The comparative compositions for heat aging tests were prepared using both Formulation A and Formulation B, and the heat aging rating for each are shown in Table 23 below.

TABLE 23

| Ex # | Formulation A | Formulation B |
|---|---|---|
| Comp Ex 5 | D | D |
| Comp Ex 6 | D | D |
| Comp Ex 7 | E | E |
| Comp Ex 8 | D | E |
| Comp Ex 9 | D | E |
| Comp Ex 10 | C | C |
| Comp Ex 11 | C | C |
| Comp Ex 12 | E | E |
| Comp Ex 13 | E | E |

These comparative azo pigment dispersions comprise an azo pigment having an alkoxy group in the P1 and/or P5 position. As these results show, each has considerably poorer heat stability in both formulations, regardless of which type of synergist is used, even if the diazo component of the synergist is the same as that of the azo pigment. Some did not form stable dispersions in either formulation (Comparative Examples 7, 12, and 13). Furthermore, inclusion of synergists Syn1 and Syn7 (Comparative Examples 5 and 6), which were shown above to produce azo pigment dispersions having excellent heat stability in the same two formulations when used in combination with azo pigments that do not have an alkoxy group in either the P1 or P5 position, did not result in dispersions having good heat stability. Since poor dispersion stability is found, these comparative azo pigment dispersions would not be expected to form inkjet ink compositions that jet reliably in an inkjet ink printer.

Examples 16

Inkjet ink compositions of the present invention were prepared using one of the formulations shown in Table 24 below (the weight percent pigment is the amount of the azo pigment/synergist combination on a dry basis).

TABLE 22

| Ex | Pigment Synergist | P1 S1 | P2 S2 | P3 S3 | P4 S4 | P5 S5 | P6 S6 |
|---|---|---|---|---|---|---|---|
| Comp Ex 5 | PY203 | OMe | H | H | H | $NO_2$ | Me |
| | Syn1 | H | H | $SO_3Na$ | H | $NO_2$ | Me |
| Comp Ex 6 | PY203 | OMe | H | H | H | $NO_2$ | Me |
| | Syn7 | H | H | $CH_2C(OH)(PO_3H_2)_2$ Na salt | H | $NO_2$ | Me |
| Comp Ex 7 | PY203 | OMe | H | H | H | $NO_2$ | Me |
| | Syn14 | OMe | H | H | $SO_3Na$ | $NO_2$ | Me |
| Comp Ex 8 | PY74 | OMe | H | H | H | OMe | $NO_2$ |
| | Syn12 | H | H | $SO_3Na$ | H | OMe | $NO_2$ |
| Comp Ex 9 | PY74 | OMe | H | H | H | OMe | $NO_2$ |
| | Syn15 | H | H | $SO_2NHCH(PO_3H_2)_2$ Na salt | H | OMe | $NO_2$ |
| Comp Ex 10 | PY74 | OMe | H | H | H | OMe | $NO_2$ |
| | Syn16 | OMe | H | H | $SO_3Na$ | OMe | $NO_2$ |
| Comp Ex 11 | PY74 | OMe | H | H | H | OMe | $NO_2$ |
| | Syn16 | OMe | H | H | $SO_3Na$ | OMe | $NO_2$ |
| | Syn15 | H | H | $SO_2NHCH(PO_3H_2)_2$ Na salt | H | OMe | $NO_2$ |
| Comp Ex 12 | PY74 | OMe | H | H | H | OMe | $NO_2$ |
| | Syn17 | OMe | H | H | H | H | $SO_3Na$ |
| Comp Ex 13 | PY74 | OMe | H | H | H | OMe | $NO_2$ |
| | Syn18 | OMe | H | H | H | $NO_2$ | $SO_3Na$ |

TABLE 24

| Component | Weight % Formulation A | Formulation B |
|---|---|---|
| pigment | 4 | 6 |
| triethylene glycol monobutyl ether | 5 | 5 |
| glycerol | 10 | 10 |
| Surfynol 465 | 1 | 1 |
| water | 80 | 78 |

The specific azo pigment dispersion used in each example is shown in Table 25 below.

TABLE 25

| Ex # | Dispersion Ex. # | Formulation | Chroma | Hue angle |
|---|---|---|---|---|
| 16 | 1 | A | 75.2 | 98.7 |
| 17 | 2 | A | 68.2 | 101.5 |
| 18 | 3 | A | 79.0 | 97.9 |
| 19 | 4 | A | 69.1 | 83.8 |
| 20 | 5 | A | 75.5 | 99.1 |
| 21 | 6 | A | 89.1 | 98.0 |
| 22 | 15 | B | 88.6 | 96.5 |

Each inkjet ink composition was printed using an EPSON C88+ printer and Xerox 4200 plain paper. Test images were printed, and color readings were conducted using a Macbeth ColorEye 0/45 spectrocolorimeter. Results are also shown in Table 25. As these results show, the inkjet ink compositions of the present invention produce printed images having excellent overall color properties.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An inkjet ink composition comprising:
   a) a liquid vehicle;
   b) at least one azo pigment comprising a colorant having the formula

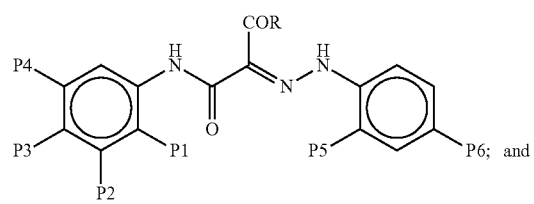

c) at least one synergist having the formula

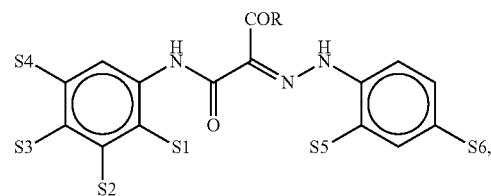

wherein R is a C1-C6 alkyl group, P1-P6 are substituent groups of the colorant of the azo pigment and P1 and P5 are not an alkoxy group, and S1-S6 are substituent groups of the synergist, with at least one of S2-S4 comprising an ionic or ionizable group, S5=P5, and S6=P6.

2. The inkjet ink composition of claim 1, wherein R is a methyl group.

3. The inkjet ink composition of claim 1, wherein S3 comprises an ionic group or ionizable group.

4. The inkjet ink composition of claim 1, wherein P5 is a nitro group and S5 is a nitro group.

5. The inkjet ink composition of claim 1, wherein the ionic or ionizable group is a carboxylic acid group, a sulfonic acid group, a phosphonic acid group, or salts thereof.

6. The inkjet ink composition of claim 1, wherein the ionic or ionizable group is a geminal bisphosphonic acid group, partial esters thereof, or salts thereof.

7. The inkjet ink composition of claim 1, wherein the ionic or ionizable group has the formula —CQ(PO$_3$H$_2$)$_2$, partial esters thereof, or salts thereof, wherein Q is H, R', OR', SR', or NR'$_2$, wherein R', which can be the same or different, is H, a C1-C18 alkyl group, a C1-C18 acyl group, an aralkyl group, an alkaryl group, or an aryl group.

8. The inkjet ink composition of claim 7, wherein the ionic or ionizable group has the formula —(CH$_2$)$_n$—CQ(PO$_3$H$_2$)$_2$, partial esters thereof, or salts thereof, wherein n is 1 to 3.

9. The inkjet ink composition of claim 1, wherein the ionic or ionizable group has the formula —CR"(PO$_3$H$_2$)$_2$ or salts thereof, wherein R" is H or a C1-C6 alkyl group.

10. The inkjet ink composition of claim 1, wherein the ionic or ionizable group has the formula —CO—Z—CH(PO$_3$H$_2$)$_2$ or —SO$_2$—Z—CH(PO$_3$H$_2$)$_2$ or salts thereof, wherein Z is O, S, or NR' and R' is H, a C1-C18 alkyl group, a C1-C18 acyl group, an aralkyl group, an alkaryl group, or an aryl group.

11. The inkjet ink composition of claim 10, wherein Z is NH.

12. The inkjet ink composition of claim 1, wherein the liquid vehicle is an aqueous vehicle.

13. The inkjet ink composition of claim 1, wherein the azo pigment is Pigment Yellow 1, Pigment Yellow 1:1, Pigment Yellow 2, Pigment Yellow 3, Pigment Yellow 4, Pigment Yellow 5, Pigment Yellow 6, Pigment Yellow 9, Pigment Yellow 75, Pigment Yellow 98, Pigment Yellow 116, or combinations thereof.

14. The inkjet ink composition of claim 1, wherein the azo pigment is Pigment Yellow 1, Pigment Yellow 1:1, Pigment Yellow 6, Pigment Yellow 9, or combinations thereof.

* * * * *